United States Patent [19]

Park

[11] Patent Number: 5,057,784
[45] Date of Patent: Oct. 15, 1991

[54] AUTOMATIC READING APPARATUS FOR CAPSTAN REPRODUCING SPEED MODE

[75] Inventor: Seong B. Park, Kyungki, Rep. of Korea

[73] Assignee: Goldstar Co., Ltd., Seoul, Rep. of Korea

[21] Appl. No.: 383,432

[22] Filed: Jul. 24, 1989

[30] Foreign Application Priority Data

Jul. 25, 1988 [KR] Rep. of Korea ................ 9355/1988

[51] Int. Cl.$^5$ ........................... G01P 3/56; G01P 3/48
[52] U.S. Cl. ..................................... 328/134; 377/20; 235/103; 307/271; 360/73.06
[58] Field of Search ..................... 235/103; 377/20, 47; 328/134; 388/907, 912; 324/160; 360/73.06

[56] References Cited

U.S. PATENT DOCUMENTS

| | | | |
|---|---|---|---|
| 4,341,995 | 7/1982 | Hennick | 328/134 |
| 4,624,005 | 11/1986 | Tachino | 377/20 |
| 4,682,247 | 7/1987 | Doutsbo | 360/10.2 |
| 4,763,261 | 8/1988 | Imanaka et al. | 377/20 |
| 4,777,448 | 10/1988 | Satoh | 377/47 |
| 4,839,834 | 6/1989 | Omae et al. | 377/20 |

FOREIGN PATENT DOCUMENTS 195862 12/1981 Japan.

Primary Examiner—Stanley D. Miller
Assistant Examiner—Richard Roseen

[57] ABSTRACT

An apparatus for automatically reads a mode of a capstan reproducing speed by counting pulse signals generated from a capstan motor. This apparatus uses a pulse generator for generating pulse signals and, a frequency multiplier for doubling the capstan frequency generator signals. A counter circuit is used for counting output pulse signals of the frequency multiplier, and a gate processing circuit outputs three different reproducing speed discrimination control pulse signals in response to the signals counted by the counter circuit. A detection error compensating circuit outputs an Extended playing mode discrimination signal and a Long Playing mode discrimination signal from a reproducing speed discrimination control signal of the gate processing circuit by being driven by the pulse signals of the pulse generator. A Standard Playing mode discrimination signal is outputted by a logic combination from output signals of the detection error compensating circuit.

2 Claims, 3 Drawing Sheets

FIG. 3

| | 00001 1(10) | 01011 11(10) | 10000 16(10) | 10101 20(10) | 10110 22(10) | 11100 28(10) | 11111 31(10) |
|---|---|---|---|---|---|---|---|
| DATA = Q4 Q3 Q2 Q1 Q0 | | | | | | | |
| GN 1 | 1 | 0 | 1 | 1 | 1 | 1 | 0 |
| GR 1 | 0 | 0 | 0 | 0 | 0 | 0 | 1 |
| GN 3 | 1 | 1 | 1 | 1 | 1 | 1 | 0 |
| I 4 | 0 | 0 | 0 | 0 | 0 | 0 | 1 |
| DF 2 | 0 | 0 | 0 | 0 | 0 | 0 | 1 |
| DF 4 | 0 | 0 | 0 | 0 | 0 | 0 | 1 |
| DF 6 | 0 | 0 | 0 | 0 | 0 | 0 | 1 |
| GR 5 | 0 | 0 | 0 | 1 | 1 | 1 | 0 |
| GN 2 | 1 | 1 | 1 | 0 | 0 | 0 | 0 |
| I 1 | 0 | 0 | 0 | 1 | 1 | 1 | 1 |
| GN 4 | 1 | 1 | 1 | 0 | 0 | 0 | 0 |
| I 3 | 0 | 0 | 0 | 1 | 1 | 1 | 1 |
| DF 1 | 0 | 0 | 0 | 1 | 1 | 1 | 1 |
| DF 3 | 0 | 0 | 0 | 1 | 1 | 1 | 1 |
| DF 5 | 0 | 0 | 0 | 1 | 1 | 1 | 1 |
| I 7 | 1 | 1 | 1 | 0 | 0 | 0 | 0 |
| I 8 | 1 | 1 | 1 | 0 | 0 | 0 | 0 |
| GR 6 | 0 | 0 | 0 | 0 | 0 | 0 | 1 |

AUTOMATIC READING APPARATUS FOR CAPSTAN REPRODUCING SPEED MODE

BACKGROUND OF THE INVENTION

The present invention relates to an apparatus for reading a reproducing speed mode in a video cassette tape recorder, more particularly to an automatic reading apparatus for a capstan reproducing speed which is capable of automatically reading a mode of a capstan reproducing speed with a logic circuit by determining the frequencies generated from a capstan motor.

In a general video cassette tape recorder, the mode of the reproducing speed has been discriminated by software contained in a microcomputer which is preprogrammed.

Accordingly, in such a prior art apparatus, there has been a possibility of erroneously discriminating the reproducing speed mode due to external noise signals, the efficiency of use of the microcomputer becoming deteriorated, and the manufacturing thereof being difficult.

SUMMARY OF THE INVENTION

An object of the present invention is to provide an automatic reading apparatus for a capstan reproducing speed mode which is capable of reading the capstan producing speed mode by hardware not by software in a microcomputer.

Another object of the present invention is to provide an automatic reading apparatus which is capable of automatically reading a capstan reproducing speed mode by a logic circuit having a simple construction using a counter circuit and logic gates.

The above objects of the present invention is attained by counting with a counter circuit how many a signal of pulses are generated by a capstan frequency generator during one period of a reference clock signal, and by using logic gates, D flip-flops and the like, to read and output the reproducing speed of tape in accordance with counted values.

BRIEF DESCRIPTION OF THE DRAWINGS

FIG. 3 is a truth table showing the operations of each part of FIG. 2.

DETAILED DESCRIPTION OF THE INVENTION

Figure 1:
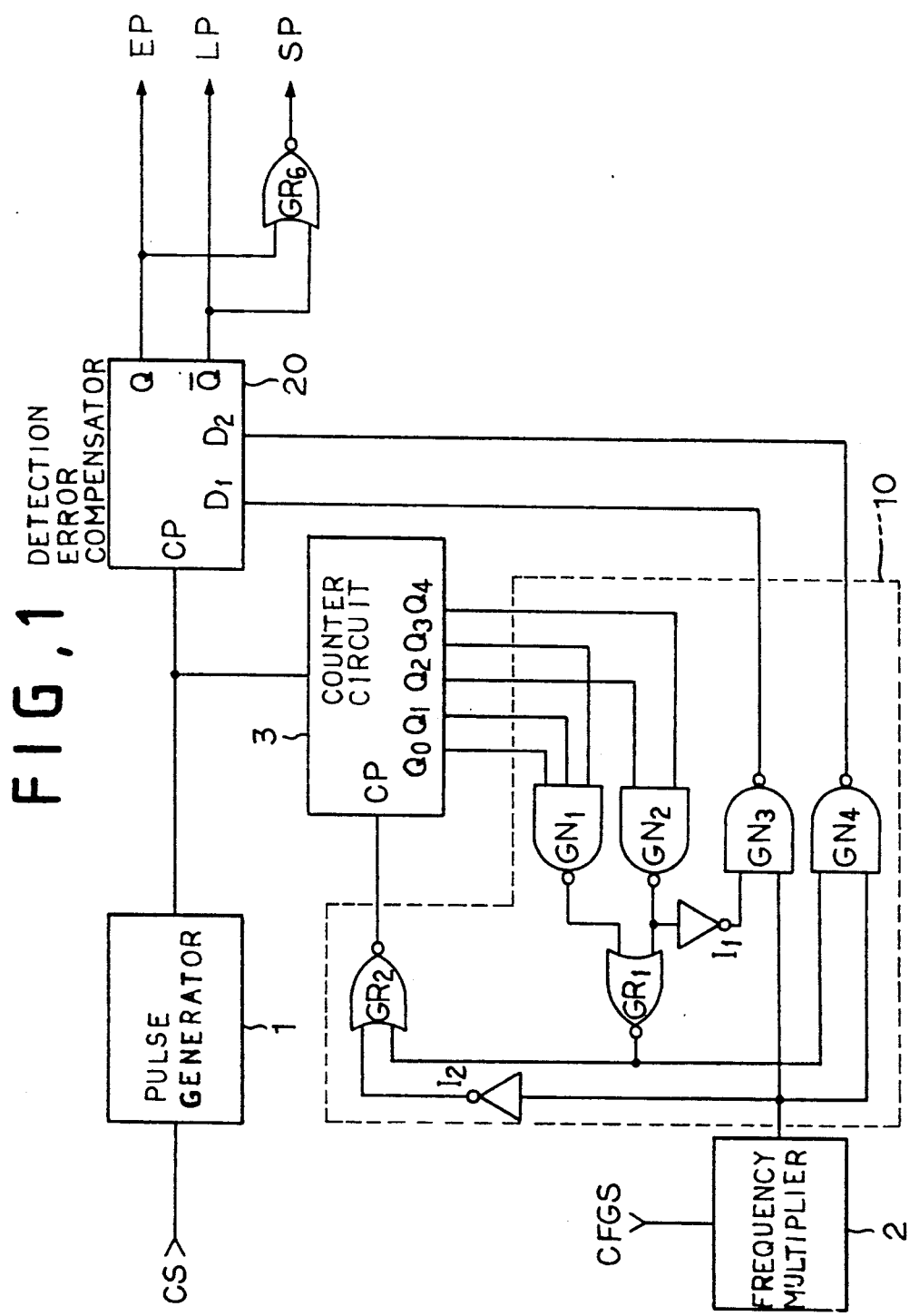
FIG. 1 is a block diagram of an automatic reading apparatus for a capstan reproducing speed mode according to the present invention.

Referring to FIG. 1, the automatic reading apparatus for a capstan reproducing speed mode, according to the present invention, comprises a pulse generator 1 which receives a control clock signal CS to generate a signal of pulses; a frequency multiplier 2 which doubles the frequency of a capstan frequency generator signal CFGS; a counter circuit 3 which is reset by pulse signals from the pulse generator 1 and receives and counts pulse signals outputted from the frequency multiplier 2; and a gate processing circuit 10 which is constituted such that output terminals $Q_0$, $Q_1$, $Q_3$ and $Q_2$, $Q_4$ of the counter circuit 3 are connected via NAND gates $GN_1$, $GN_2$ to input terminals of a NOR gate $GR_1$ connected to the NAND gates $GN_1$ and $GN_2$ an output terminal of the NOR gate $GR_1$ is connected to one input terminal of a NOR gate $GR_2$ and the output of the frequency multiplier 2 is connected via an inverter $I_2$ to other input terminal of the NOR gate $GR_2$ whose output terminal is connected to a clock terminal CP of the counter circuit 3. The output of the frequency multiplier 2 is connected to one input terminal of NAND gates $GN_3$ and $GN_4$, and the output of NOR gate $GR_1$ is also connected to other input terminal of the NAND gate $GN_3$. The output of the NAND gate $GN_2$ is connected via an inverter $I_1$ to other input terminal of the NAND gate $GN_4$ so that when all the output terminals $Q_0$–$Q_4$ of the counter circuit 3 generate high level signals, the output signal of pulses from the frequency multiplier 2 are not applied to the clock terminal CP of the counter circuit 3. The NAND gates $GN_3$ and $GN_4$ generate reproducing speed discrimination control signals depending upon the counted pulse signals received by the counter circuit 3. The present invention also includes a detection error compensating circuit 20 which is driven by the pulse signals of the pulse generator 1 to output EP (Extended Playing) mode discrimination signals (EP) and LP (Long Playing) mode discrimination signals (LP) from the reproducing speed discrimination control signals of the gate processing circuit 10, and a NOR gate $GR_6$ which outputs SP (Standard Playing) mode discrimination signals (SP) generated by a logic combination of the output signals of the detection error compensating circuit 20.

Figure 2:
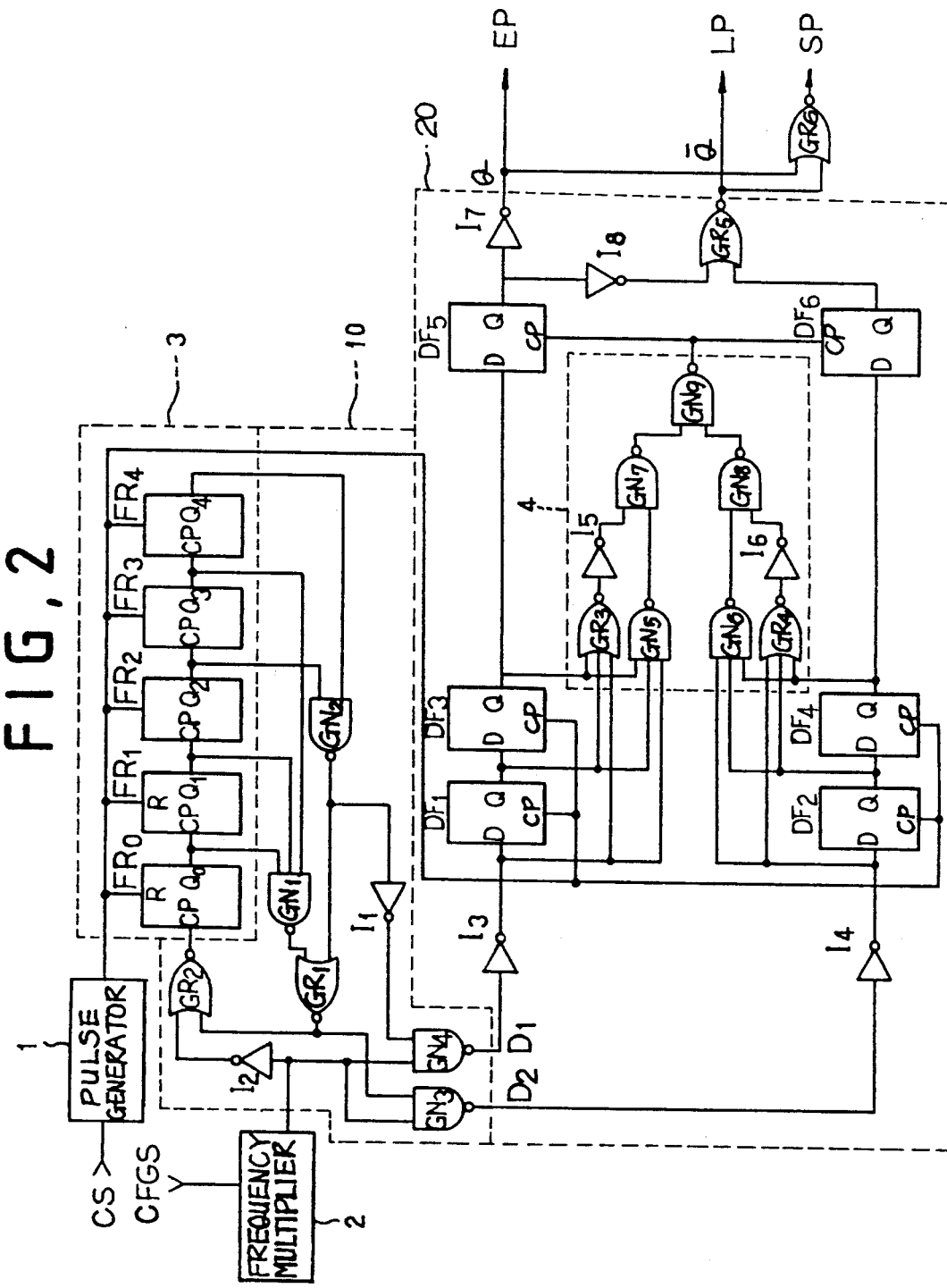
FIG. 2 is a detailed circuit diagram of FIG. 1.

Referring to FIG. 2, there is shown a detailed circuit of FIG. 1. As shown in FIG. 2, the counter circuit 3 comprises counters $FR_0$–$FR_4$ which are are simultaneously reset by a signal of pulses from the pulse generator 1 and are consecutively driven by an output signal of pulses from the frequency multiplier 2 which pass through inverter $I_2$ and NOR gate $GR_2$. The detection error compensating circuit 20 is constituted in a manner that the reproducing speed discrimination signals output from NAND gates $GN_4$ and $GN_3$ of the gate processing circuit 10 are made to pass through inverters $I_3$ and $I_4$, respectively, and flip-flops $DF_1$, $DF_3$ and $DF_2$, $DF_4$ which are simultaneously driven by pulse signals of the pulse generator 1 and whose outputs are then applied to input terminals D of flip-flops $DF_5$ and $DF_6$. The said flip-flops $DF_5$ and $DF_6$ are made to be driven by output signals from a clock control unit 4 which comprises NAND gates $GN_5$–$GN_9$, NOR gates $GR_3$ and $GR_4$, and inverters $I_5$ and $I_6$ so as to output low level signals when the output signals of the inverter $I_4$ are identical to those of the flip-flops $DF_2$ and $DF_4$. The signal of the output terminal Q of the flip-flop $DF_5$ is made to be outputted as EP mode discrimination signals (EP) through an inverter $I_7$, and after passing through an inverter $I_8$, the signal of the output terminal Q of the flip-flop $DF_5$ is outputted as LP mode discrimination signals (LP) through the NOR gate $GR_5$ together with the signal of the output terminal Q of the flip-flop $DF_6$.

FIG. 3 is a truth table showing the output states of NAND gates $GN_1$–$GN_4$, NOR gates $GR_1$, $GR_5$ and $GR_6$, inverters $I_1$, $I_3$, $I_4$, $I_7$ and $I_8$ and flip-flops $DF_1$–$DF_6$ in response to signals of the output terminals $Q_0$–$Q_4$ of the counter circuit 3.

Below, the operation and effect of the present invention will be described in detail.

When a clock control signal CS is inputted to the pulse generator 1, one pulse signal is generated from the pulse generator 1 for every period of the clock signal CS, and since this pulse signal is applied to a reset terminal R of the counter circuit 3 to reset the counters $FR_0$–$FR_1$, the output signal of pulses of the frequency multiplier 2 are counted at the beginning of the clock period. That is to say, a capstan frequency generator signal (CFGS) which is generated in response to the rotation of a capstan motor is doubled by the frequency multiplier 2, and thereafter applied to a clock terminal CP of the counter $FR_0$ via the inverter $I_2$ and NOR gate $GR_2$, so that the counter circuit 3 determines the frequencies of the signals being applied.

At this time, since the frequency of the capstan frequency generator signal (CFGS) varies depending upon the modes of the capstan reproducing speed, the values are determined by the counter circuit 3 per one period of which the pulse signal is outputted from the pulse generator 1. The counted values are as follows:

EP mode = 480 Hz/30 Hz = 16 = 10000(2)
LP mode = 720 Hz/30 Hz = 24 = 11000(2)
SP mode = 1440 Hz/30 Hz = 48 = 110000(2)

Accordingly, in case that the capstan reproducing speed mode is EP mode, the counted value outputted from the output terminals $Q_4$–$Q_0$ of the counter circuit 3 become "10000", and at this moment, the gate processing circuit 10 and detection error compensating circuit 20 are operated as shown in the truth table of FIG. 3. That is to say, since all the NAND gates $GN_1$ and $GN_2$ of the gate processing unit 10 output high level signals and the high level signals are applied to an input terminal of the NOR gate $GR_1$, a low level signal is outputted from the NOR gate $GR_1$ and applied to an input terminal of a NAND gate $GN_3$. A high level signal is outputted from the NAND gate $GN_3$, the signal is inverted into a low level signal and then applied to an input terminal D of the flip-flop $DF_2$. Furthermore, the high level signal outputted from the NAND gate $GN_2$ is inverted into a low level signal by the inverter $I_1$ and applied to a NAND gate $GN_4$, so that a high level signal is outputted from the NAND gate $GN_4$. This high level signal is inverted again to a low level signal by an inverter $I_3$ and applied to an input terminal D of a flip-flop $DF_1$. In addition, since the flip-flops $DF_1$–$DF_4$ are designed such that the pulse signal of the pulse generator 1 is applied as a clock signal, the output signals of the inverters $I_3$ and $I_4$ are outputted to the output terminals Q and Q, respectively, when a third pulse signal is outputted from the pulse generator 1. That is to say, when a first pulse signal is outputted from the pulse generator 1 low level signals being outputted from the inverters $I_3$ and $I_4$ in accordance with the counted values of the counter circuit 3 are applied, respectively, to the input terminals D and D of the flip-flops $DF_1$ and $DF_2$. When a second pulse signal is outputted from the pulse generator 1, low level signals are outputted from the flip-flops $DF_1$ and $DF_2$ and applied, respectively, to input terminals D and D of the flip-flops $DF_3$ and $DF_4$. Thereafter when a third pulse signal is outputted from the pulse generator 1, low level signals are outputted from the flip-flops $DF_3$ and $DF_4$ and applied to input terminals D and D of flip-flops $DF_5$ and $DF_6$.

On the other hand, the output signals of the inverters $I_3$ and $I_4$ and flip-flops $DF_1$–$DF_4$ are logically combined at the clock control unit 4 and applied to the flip-flops $DF_5$ and $DF_6$ as clock signals, and thus when identical signals are outputted from the inverter $I_3$ and flip-flops $DF_1$ and $DF_3$ and the inverter $I_4$ and flip-flops $DF_2$, $DF_4$, respectively, the clock signals are then applied to the flip-flops $DF_5$ and $DF_6$. That is to say, when the inverter $I_3$ and flip-flops $DF_1$ and $DF_3$ output low level signals, a high level signal is outputted from the NOR gate $GR_3$. This high level signal is inverted to a low level signal by the inverter $I_5$ and applied to an input terminal of a NAND gate $GN_7$ so that a high level signal is outputted from the output terminal of the NAND gate $GN_7$. Similarly, when low level signals are outputted from the inverter $I_4$ and flip-flops $DF_2$ and $DF_4$ all together as above, a NOR gate outputs a high level signal. Since this high level signal is inverted into a low level signal by an inverter $I_6$, a high level signal is outputted from a NAND gate $GN_8$. Thus, since the NAND gates $GN_7$ and $GN_8$ outputted high level signals all together, low level signals are output from a NAND gate $GN_9$ and applied to the flip-flops $DF_5$ and $DF_6$ as clock signals.

Furthermore, when high level signals are outputted from all the inverter $I_3$ and flip-flops $DF_1$ and $DF_3$, low level signals are outputted from the NAND gate $GN_5$ and thus high level signals are outputted from the NAND gate $GN_7$. When high level signals are outputted from all the inverter $I_4$ and flip-flops $DF_2$ and $DF_4$, low level signals are outputted from the NAND gate $GN_6$ and thus high level signals are outputted from the NAND gate $GN_8$. Thus high level signals are outputted from the NAND gates $GN_7$ and $GN_8$, so that low level signals are outputted from a NAND gate $GN_9$ and applied to the flip-flops $DF_5$ and $DF_6$ as clock signals.

Accordingly, the flip-flops $DF_5$ and $DF_6$ output their input signals only when the counted values of the output terminals $Q_0$–$Q_4$ of the counter circuit 3 are successively identical three times, thereby preventing the discrimination of the capstan speed mode which may instantly vary due to noise.

On the other hand, when low level signals are outputted from the output terminals Q and Q of the flip-flops $DF_5$ and $DF_6$ as described above, the low level signal outputted from the output terminal Q of the flip-flop $DF_5$ is inverted to a high level signal by the inverter $I_7$ and outputted as an EP mode discrimination signal (EP). However, since the low level signal outputted from the output terminal Q of the flip-flop $DF_5$ is inverted to a high level signal by the inverter $I_8$, a low level signal is outputted from the NOR gate $GR_5$ and a low level signal is also outputted from the NOR gate $GR_6$ by the high level signal being outputted from the inverter $I_7$.

Consequently, in case that the counted values which are outputted from the output terminals $Q_4$–$Q_0$ of the counter circuit 3 are below "10000", a high level signal is outputted from the inverter $I_7$, as can be seen in the truth table of FIG. 3, and applied as an EP mode discrimination signal (EP).

On the other hand, in case that the capstan reproducing speed mode is LP mode, the counted values which are outputted from the output terminals $Q_4$–$Q_0$ of the counter circuit 3 become "11000". Accordingly, when the counted values, i.e., "10101", "10110", or "11100" are outputted from the output terminals $Q_4$–$Q_0$ of the counter circuit 3, a low level signal is outputted from the NAND gate $GN_2$ as shown in the truth table of FIG. 3. Since this low level signal is inverted to high level signal by the inverter $I_1$ and applied to an input terminal of the NAND gate $GN_4$, a low level signal is outputted from the output terminal of the NAND gate $GN_4$. This low level signal is inverted to a high level signal by the inverter $I_3$ and applied to the input terminal D of the flip-flop $DF_1$. And at this moment, a high level signal which is outputted from the NAND gate GN$_3$ is inverted to a low level signal by the inverter I$_4$ and applied to the input terminal D of the flip-flop DF$_2$.

Consequently, at this moment a high level signal is outputted from the output terminal Q of the flip-flop DF$_5$ and a low level signal is outputted from the output terminal Q of the flip-flop DF$_6$. Therefore, a high level signal is outputted from the NOR gate GR$_5$ and applied as an LP mode discrimination signal (LP).

On the other hand, in case that the mode of the capstan reproducing speed is SP mode, the counted values "11111" are outputted from the output terminals Q$_4$-Q$_0$ of the counter circuit 3. That is to say, when the counted values "11111" are outputted from the output terminals Q$_4$-Q$_0$ of the counter circuit 3, low level signals are outputted from the NAND gates GN$_1$ and GN$_2$, as shown in the truth table of FIG. 3. A high level signal is outputted from the NOR gate GR$_1$, accordingly, a high level signal is successively outputted from the NOR gate GR$_2$ irrespective of the signal being outputted from the frequency multiplier 2 and being passed through the inverter I$_2$. The counted values of the counter circuit 3 are maintained as "11111". Accordingly, since the low level signal which is outputted from the NAND gate GN$_2$ at this moment is inverted to high level signal by the inverter I$_1$ and applied to the input terminal of the NAND gate GN$_4$, a low level signal is outputted from the output terminal of the NAND gate GN$_4$. This low level signal is inverted again to a high level signal by the inverter I$_3$ and applied to the input terminal D of the flip-flop DF$_1$. Furthermore, a low level signal is outputted from the NAND gate GN$_3$ by the high level signal which is outputted from the NOR gate GR$_1$ at that moment, and the low level signal is inverted to a high level signal by the inverter I$_4$ and then applied to the input terminal D of the flip-flop DF$_2$.

Consequently, high level signals are outputted from the output terminals Q and Q of the flip-flops DF$_5$ and DF$_6$, respectively, and thus, a high level signal is outputted from the NOR gate GR$_6$ and applied as an SP discrimination signal (SP).

As described above in detail, the present invention has the advantages in that the processing operation is less prone to error since the frequency is determined by a counter circuit which counts how many pulse signals are generated from the capstan frequency generator during one period of the control clock signal and the mode of the capstan reproducing speed which depends upon the counted values is automatically read by use of a logic circuit using logic gates and D flip-flops. It is also possible to manufacture the present invention at low prices and use mass production by constituting an integrated circuit. Furthermore, according to the present invention, it is also possible to easily interface the information that is capable of automatically adjusting the speed of the capstan motor since the mode of the capstan reproducing speed is automatically read and to automatically display the reproducing mode by the interface of system control and microcomputer.

What is claimed is:

1. An automatic reading apparatus for determining a capstan reproducing speed mode, comprising:
   pulse generator means for receiving a control clock signal and for generating a signal of pulses corresponding to a period of said control clock signal;
   frequency multiplier means for multiplying a frequency of a capstan frequency generator signal and for generating an output signal of pulses therefrom;
   counter means, operative connected to said pulse generator means and said frequency multiplier means, for counting said output signal of pulses from said frequency multiplier means;
   processing means for preventing said output signal of pulses from frequency multiplier means from being applied to said counter means when said counter means has counted to a maximum value and for outputting reproducing speed discrimination control signals in response to a count value received from said counter means; and
   detection error compensating means, responsive to said output signal of pulses from said pulse generator means, for outputting an extended playing mode discrimination signal and a long playing mode discrimination signal according to said reproducing speed discrimination control signals from said processing means and for outputting a standard playing mode discrimination signal according to a logic combination of said extended playing mode discrimination signal and said long playing mode discrimination signal.

2. An automatic reading apparatus for determining a capstan reproducing speed mode, comprising:
   pulse generator means for receiving a control clock signal and for generating a signal of pulses corresponding to a period of said control clock signal;
   frequency multiplier means for multiplying a frequency of a capstan frequency generator signal and for generating an output signal of pulses therefrom;
   counter means, operative connected to said pulse generator means and said frequency multiplier means, for counting said output signal of pulses from said frequency multiplier means;
   processing means for preventing said output signal of pulses from frequency multiplier means from being applied to said counter means when said counter means has counted to a maximum value and for outputting reproducing speed discrimination control signals in response to a count value received from said counter means; and
   detection error compensating means, responsive to said signal of pulses from said pulse generator means, for outputting an extended playing mode discrimination control signal and a long playing mode discrimination signal when reproducing speed discrimination control signals are outputted three times from said processing means and for outputting a standard playing mode discrimination signal according to a logic combination of said extended playing mode discrimination signal and said long playing mode discrimination signal.

* * * * *